Figure 4:
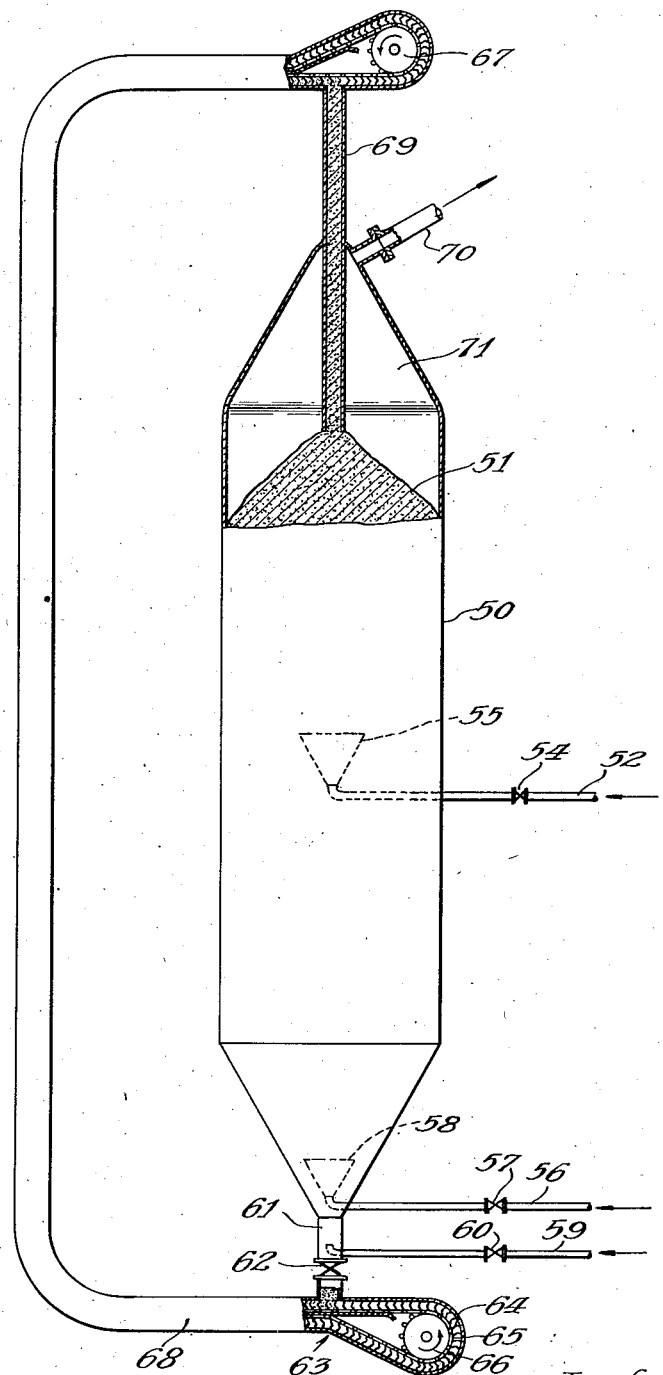

Dec. 25, 1945. J. McAFEE 2,391,434
METHOD OF CARRYING OUT CATALYST REACTIONS
Filed March 8, 1943 2 Sheets-Sheet 1
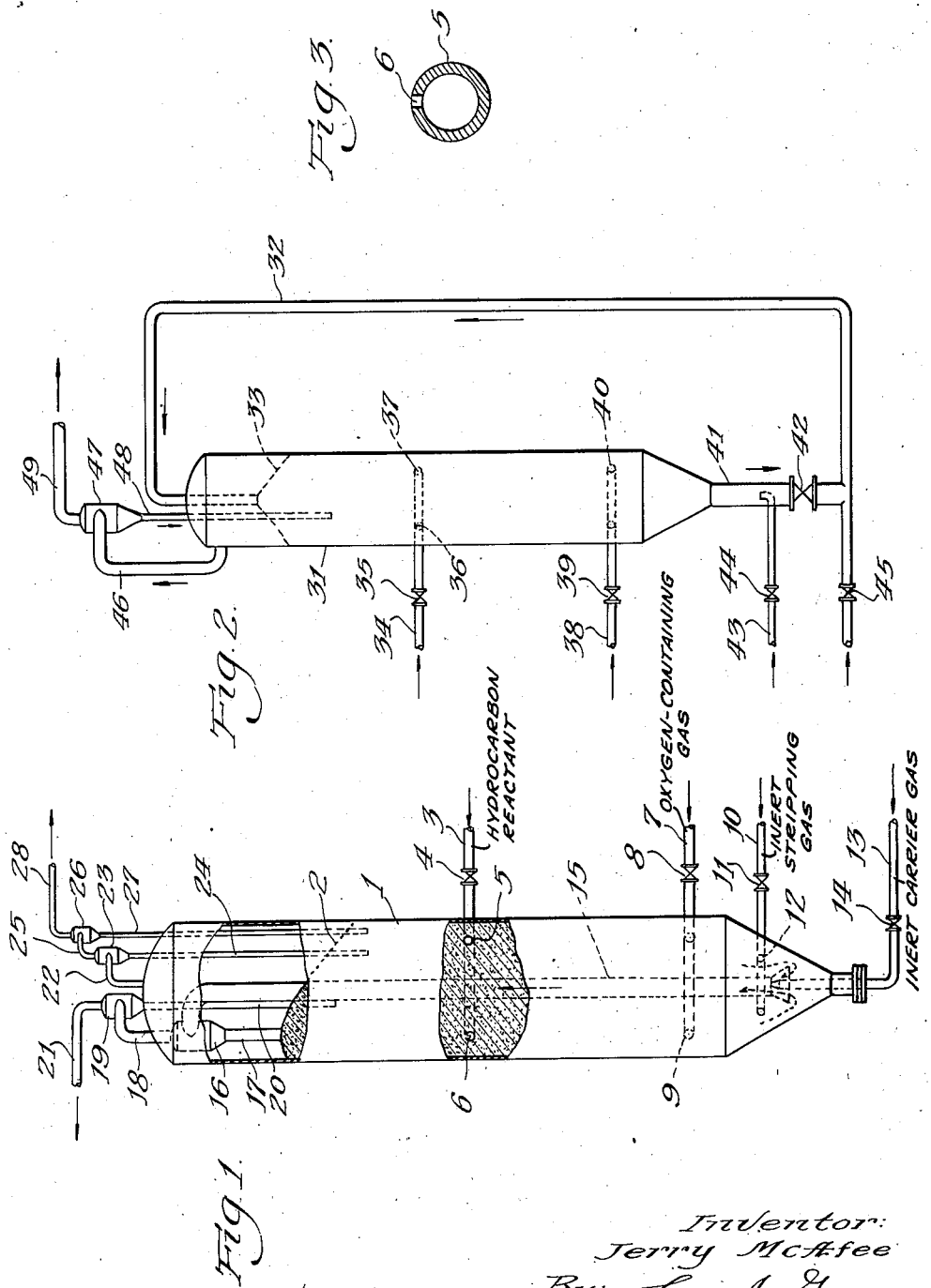
Inventor:
Jerry McAfee
By: Lee J. Gary
Attorney.

Patented Dec. 25, 1945

2,391,434

UNITED STATES PATENT OFFICE 2,391,434

METHOD OF CARRYING OUT CATALYST REACTIONS

Jerry McAfee, Riverside, Ill., assignor to Universal Oil Products Company, Chicago, Ill., a corporation of Delaware Application March 8, 1943, Serial No. 478,487

4 Claims. (Cl. 196—52)

This invention relates to a new and improved method and apparatus for carrying out catalyst reaction processes, and more particularly processes which are most advantageously accomplished when they are conducted at low pressures.

My invention may be advantageously adapted to many catalytic processes and is especially suited to use in processes such as cracking, dehydrogenation of hydrocarbons and particularly processes for the production of butadiene by the dehydrogenation of butanes and/or butylenes in either single or multiple stage operations.

It has been found that butadiene may be more efficiently produced in the above mentioned process when low operating pressures are employed. This has been heretofore accomplished by employing vacuum operation or by the use of diluent materials to obtain a low partial pressure of the reactants.

In this process catalysts containing chromia and alumina are commonly employed and, during the operation, a deleterious material will accumulate on the catalyst which must be periodically removed in order to continue operations. In the fixed bed type of operation, wherein the catalyst is maintained in a stationary position in the reactor, it is necessary to employ a plurality of reactors and alternate their reaction between processing and regenerating of the catalyst. Several moving bed processes have been proposed in which the catalyst is transported between the reaction zone and the catalyst regeneration zone by various means such as conveyors, elevators or, in some cases, by means of the reactant materials or catalyst regeneration gases. These moving bed processes also require a plurality of reactors, the catalytic reaction taking place in one vessel and the regeneration of the catalyst taking place in another.

According to my invention I propose to conduct both processing of reactants and regeneration of the catalyst in the same vessel. This will result in a more economical process both from the standpoint of operation and installation costs.

One of the features of my invention is the use of a single reaction vessel for conducting both the catalytic conversion reaction and the catalyst regeneration reaction. Another feature of my invention is the use of inert gases generated during the combustion of the deleterious material which accumulates on the catalyst as a diluent for use during the conversion reaction.

In one specific embodiment my invention consists of a method of conducting catalyst promoted reactions wherein the catalyst accumulates a deposite of deleterious material which must be periodically removed, which comprises alternately contacting a moving bed of said catalyst with reactant materials commingled with a diluent produced as hereinafter set forth and with an oxygen containing gas, said oxygen containing gas causing combustion of said deleterious material and producing said diluent.

In processes, such as the above mentioned process for the conversion of butanes to butadiene by dehydrogenation, chromia alumina composite catalysts are commonly employed. This process is most advantageously conducted at low hydrocarbon pressures either atmospheric or subatmospheric and at temperatures within the range of about 1000 to 1300° F. After a period of time a carbonaceous material accumulates on the catalyst and this must be removed in order that the process may continue most efficiently. The removal of this deleterious material is accomplished by contacting the catalyst with an oxygen containing gas. It has been found that chromia alumina catalysts besides catalyzing the dehydrogenation reaction of butanes to butadiene also catalyze the combustion reaction of the oxygen on the carbonaceous material. By taking advantage of this fact and controlling the oxygen containing gases, combustion can be regulated so that the resulting combustion products will comprise substantially all inert materials such as $N_2$, $CO_2$ and water vapor.

I propose in my invention to make use of this inert combustion gas as a diluent to reduce the partial pressure of the hydrocarbon undergoing dehydrogenation.

According to my invention both the processing reaction and the catalyst regeneration are carried out in two superimposed zones in a common vessel, the lower portion of the vessel being devoted to catalyst regeneration and the upper portion of the vessel being employed for the hydrocarbon conversion reaction. In this way oxygen-containing gases will contact the contaminated catalyst in the lower portion of the reaction vessel, become substantially inert combustion products, and commingle with the hydrocarbon reactant materials which contact the regenerated catalyst in the upper portion of the vessel. Means are provided for transporting the regenerated catalyst from the lower portion of the vessel to the upper portion.

In order to make the features and advantages of my invention more apparent and clearly understood, reference is made to the accompanying diagrammatic drawings and the following description thereof.

Figures 1, 2 and 4 of the drawings illustrate three forms of apparatus in which the process of my invention may be accomplished.

Figure 3 of the drawings is an enlarged sectional view of distribution pipe 5 showing perforations 6.

Referring to Figure 1, numeral 1 denotes an elongated vessel suitable for the operation of my process. This vessel will be filled with suitable catalyst to an elevation indicated by dotted line 2. When the process of my invention is being employed for the dehydrogenation of butane or butenes to form butadiene, this catalyst would preferably be a composite of chromia and magnesia on alumina in respective proportions of about 12%, 2% and 86%. When conducting the process, reactant materials preheated to the desired conversion temperature will be supplied through line 3 controlled by valve 4 to distribution pipe 5 which, in the instance illustrated, is annular in shape and is provided with a plurality of perforations 6 through which the reactant materials will enter reaction vessel 1. The catalyst in the vessel will move continuously in a downward direction through the main portion of the reaction zone by means which will be hereinafter described.

In the dehydrogenation process, the reactant materials contacting the catalyst will be converted resulting in the accumulation of a carbonaceous deposit on the catalyst particles. The downward flow of catalyst through the reaction zone is maintained at such a rate that as the activity of the catalyst decreases below the desired level, the catalyst will reach a point in the zone below that at which the reactant materials are introduced and fresh catalyst which has been reactivated, as hereinafter described, will be supplied to the upper portion of the conversion zone. This conversion zone occupies the space in the reaction vessel which extends from approximately the point of introduction of reactant materials to the upper extremity of the catalyst bed which is denoted by line 2.

The reactivation of the catalyst takes place below the introduction point of the reactant materials, that is, below the level of distribution pipe 5 and is accomplished by means of regenerating gases supplied through line 7 controlled by valve 8 to a second perforate distribution pipe 9 similar in construction to the previously mentioned distribution pipe 5. Air in the regeneration gases causes the combustion of the carbonaceous deposit upon the catalyst as the catalyst moves downwardly through the reactivation zone. The products of combustion rise and commingle with the reactants supplied through pipe 5 to reduce their partial pressure and also supply some of the heat of reaction of the conversion process.

As regenerated catalyst particles continue to move downward beyond distribution pipe 9 they are stripped of any air which may be adsorbed thereon by means of suitable inert stripping gases such as nitrogen or steam supplied through line 10 controlled by valve 11 and a third perforate distribution pipe 12.

The stripped and reactivated catalyst upon reaching the lower end of the reaction vessel, will be picked up by a carrying stream of inert gases supplied by means of line 13 controlled by valve 14 and will be carried through the centrally located inner-conduit 15 to separator 16 wherein the entrained catalyst particles will be removed from the gaseous carrying stream and be returned to the upper portion of the reaction vessel by means of conduit 17. The effluent gases from separator 16 will then be conducted to separator 19 by means of conduit 18 and any catalyst particles remaining in this gaseous stream will be removed therefrom and returned to the catalyst bed by means of conduit 20. The gaseous carrying stream will then be removed from the system by means of line 21.

This gaseous material may be continuously recycled to the lower end of the reaction vessel to be again used as the catalyst carrying medium. Any suitable gaseous material may be used as this carrying stream such as spent regenerating gases, etc.

The conversion products from the process commingled with combustion products from the regeneration of the catalyst will leave vessel 1 through line 22 and enter separator 23 in which entrained catalyst particles will be separated therefrom. The conversion products will then pass through line 25 and separator 26 from which they will be conducted by means of line 28 to subsequent fractionation and recovery equipment. Catalyst particles which may have been entrained in the effluent stream of conversion products and which have been removed therefrom in separators 23 and 26 will be returned to the catalyst bed by means of conduits 24 and 27 respectively.

When employing the process of my invention for the conversion of butane to butadiene, temperatures on the order of 1000 to 1300° F. will be employed in the upper portion of the catalyst bed. Total pressure in the reaction vessel should be such that partial pressures of the reactant materials will be within the range of about atmospheric to about 50 mm. of mercury. Preferable space velocities are within the range of about 100 to 1000 volumes of charge (measured as gas at standard conditions) per volume of conversion space in the reaction zone per hour. The rate of flow of catalyst through the reaction zone will ordinarily be maintained to give a residence time of about 5 to 60 minutes. For other catalytic processes somewhat different conditions will of course be preferable.

Figure 2 shows a modified form of apparatus which is also suitable for conducting the process of my invention. In this modification, an elongated vessel 31 encompasses the processing and reactivating zones of the process. Finely divided powdered or granular catalyst, suitable for the process to be conducted, is supplied to the upper part of the reaction vessel by means of transfer line 32 the upward extent of the catalyst bed in the vessel being indicated by dotted line 33. Reactant materials supplied through line 34 controlled by valve 35 will be introduced into the reaction vessel through perforations 36 in distribution pipe 37 and will pass in an upward direction through the moving catalyst bed, thus contacting the catalyst and causing the desired conversion reaction. The contaminated catalyst will proceed downwardly through the reaction vessel and will be regenerated by air-containing reactivating gases supplied through line 38 controlled by valve 39 and perforate distribution pipe 40. The catalyst particles after being reactivated, will continue in a downward direction through conduit 41 at a rate controlled by valve 42. Any suitable stripping medium may be introduced into conduit 41 through line 43 controlled by valve 44. The catalyst particles, after passing through valve 42, will be picked up by the transfer fluid in line 32 controlled by valve 45.

The combined combustion gases, conversion products and transfer fluid will be commingled in the upper portion of the reaction vessel and removed from the system by means of conduit 46. Catalyst particles entrained in this effluent stream of fluids will be removed therefrom in separator 47 and returned to the catalyst bed by means of conduit 48. The catalyst-free effluent stream will then be conducted by means of line 49 to suitable fractionating and recovery equipment.

The transfer fluid which is employed in line 32, may be combustion products from the system which has been removed from the conversion products in the subsequent fractionation and recovery equipment.

Figure 4 shows another form of apparatus for conducting the process of my invention. This apparatus comprises a reactor 50 which is preferably an elongated vertically disposed vessel in which a moving catalyst bed 51 is confined. Reactant materials are introduced through line 52 controlled by valve 54 and distributed throughout the cross-sectional area of the catalyst bed by a suitable distributing cone 55. The reactivating gas stream is introduced through line 56 controlled by valve 57 and distributed by means of cone 58. A suitable inert stripping medium is introduced through line 59 controlled by valve 60. The lower end of vessel 50 converges into conduit 61 through which reactivated catalyst is continuously withdrawn from the conversion zone at a rate controlled by valve 62. The catalyst particles, after passing through valve 62 will be picked up by a mechanical means such as the conveyor 63 which comprises a continuous bucket elevator in which a plurality of members 64 are secured to an endless chain 65 which passes over and is driven by rotating members 66 and 67. The entire mechanism is enclosed in a suitable housing 68.

It is well within the scope of the invention to employ a conveying system comprising screw conveyors and conventional type bucket elevators when desired.

The reactivated catalyst picked up from conduit 61 by elevator 63 is continuously discharged into conduit 69 and introduced into the upper portion of catalyst bed 51. Combustion products commingled with reaction products will be withdrawn from the upper portion of vessel 50 by means of conduit 70. The upper portion of vessel 50, that is, space 71, acts as a separation zone for catalyst particles which may be entrained in the effluent fluid stream leaving the catalyst bed.

The illustrated forms of apparatus included in this specification are not to be construed as unduly limiting the present invention but are intended to show more clearly the features and advantages thereof.

I claim as my invention:

1. A process for the catalytic conversion of hydrocarbons which comprises passing subdivided solid catalyst downwardly through a vertical contacting zone, maintaining the upper portion of said zone at hydrocarbon conversion temperature and the lower portion thereof at combustion temperature, introducing oxygen-containing gas to said lower portion of the contacting zone to burn carbonaceous matter from the catalyst in this portion of said zone, introducing the hydrocarbon reactant to said zone at a point intermediate said upper and lower portions to commingle with the combustion gases formed in said lower portion, passing the resultant mixture of hydrocarbons and combustion gases upwardly through said upper portion of said zone in countercurrent contact with the catalyst descending therethrough, thereby depositing said carbonaceous matter on the catalyst, removing regenerated catalyst from the lower portion of the contacting zone and returning the same to the upper portion of said zone above the point of introduction of the hydrocarbon reactant.

2. A process for the catalytic conversion of hydrocarbons which comprises passing subdivided solid catalyst downwardly through a vertical contacting zone in the form of a continuous bed of substantially uniform cross-sectional area, maintaining in said bed an upper region of hydrocarbon conversion and a lower region of combustion, burning carbonaceous matter from the catalyst in said lower region, introducing the hydrocarbon reactant to the catalyst bed intermediate said upper and lower regions to commingle with the combustion gases formed in the lower region, passing the resultant mixture of hydrocarbons and combustion gases upwardly through said upper region in countercurrent contact with the catalyst descending therethrough and subjecting the hydrocarbon reactant to conversion conditions in this region of the bed, thereby depositing said carbonaceous matter on the catalyst, removing regenerated catalyst from the contacting zone adjacent the bottom of said bed and returning the same to said zone and to the top of the catalyst bed therein.

3. The process as defined in claim 1 further characterized in that said hydrocarbon reactant is dehydrogenated in said upper portion of the contacting zone.

4. The process as defined in claim 2 further characterized in that said hydrocarbon reactant is dehydrogenated in said upper region of the catalyst bed.

JERRY McAFEE.